July 7, 1931.  E. P. DU PONT  1,813,612

FILLER CONNECTION FOR TANKS

Filed March 14, 1930

WITNESS:
Rob't P. Kitchel.

INVENTOR
Eleuthere Paul du Pont
BY
Brown Harding
ATTORNEYS.

Patented July 7, 1931

1,813,612

UNITED STATES PATENT OFFICE

ELEUTHERE PAUL DU PONT, OF MONTCHANIN, DELAWARE

FILLER CONNECTION FOR TANKS

Application filed March 14, 1930. Serial No. 435,715.

This invention relates to filler connections for tanks particularly applicable to the gasoline tanks of automobiles.

In modern motor cars carrying the gasoline tank at the rear, the frame directly overhangs the tank and a cross support is located to the rear of and below the top of the tank, the space above the tank being used for trunk racks, etc. Accordingly there is no room for the filler neck at the top of the tank as is generally used in tanks otherwise located. As a consequence, it is necessary to provide a filler neck which extends below the longitudinal part of the frame and into the tank at a level below the normal liquid level therein. This necessitates the provision of an air vent to permit the escape of air when the tank is being filled, which air vent should be normally closed during the operation of the vehicle, to prevent spilling. In order to prevent loss of gasoline it is necessary to close the vent as well as the filler neck and in order to insure that both are closed conveniently a vent pipe has been run from the top of the tank into the upper portion of the filler neck so that the cap closing the filler neck at the same time closes the vent. It is impossible to bend the vent pipe downwardly below the lower portion of the frame and then upwardly into the filler neck, because liquid would be trapped therein, and accordingly the vent pipe has been extended directly from the upper part of the tank to the neck necessitating the provision of an opening through the portion of the frame extending below the top of the tank. Furthermore this construction creates difficulty of assemblage because of the separate connections of the vent pipe and filler neck to the tank.

It is accordingly the object of the present invention to provide a venting arrangement which overcomes the difficulties above mentioned by providing a filler neck and venting arrangement both of which are closed by the same operation and both of which are contained in a single assembly which may be soldered to the tank, and which in no way interferes with the placing of the tank in position as compared with a case in which part of the assembly (the vent pipe) must of necessity pass through the frame. In other words the completely assembled tank may be placed in the car without a subsequent connection of an extra pipe. The invention is applicable not only to gasoline tanks for vehicles, but in connection with other tanks in the filling of which similar problems arise.

Figure 1:
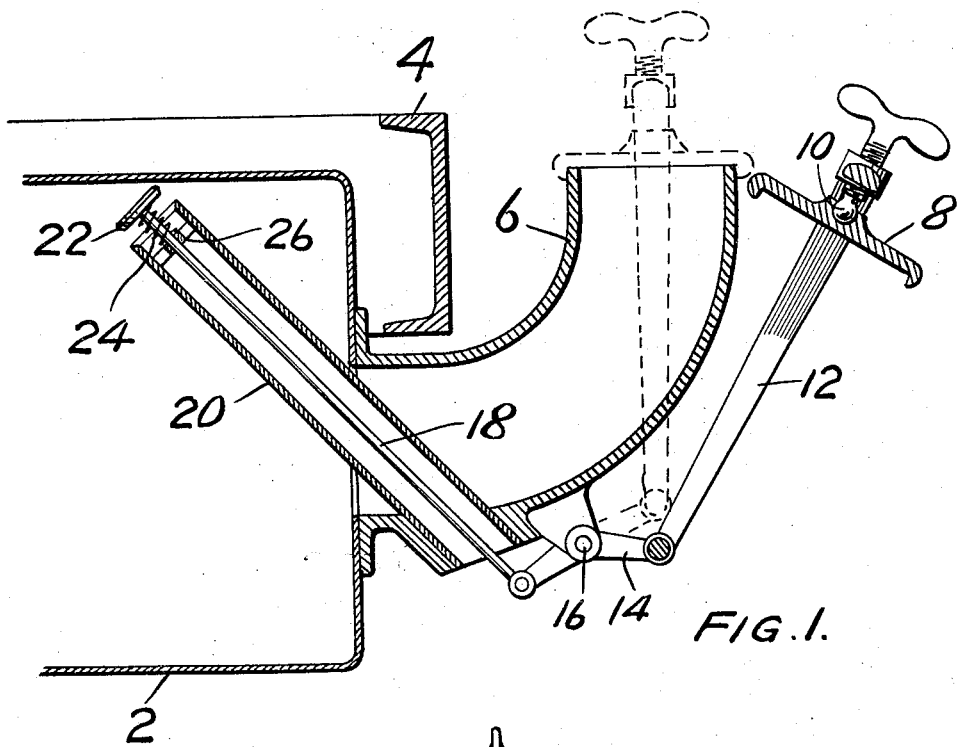
Figure 2:
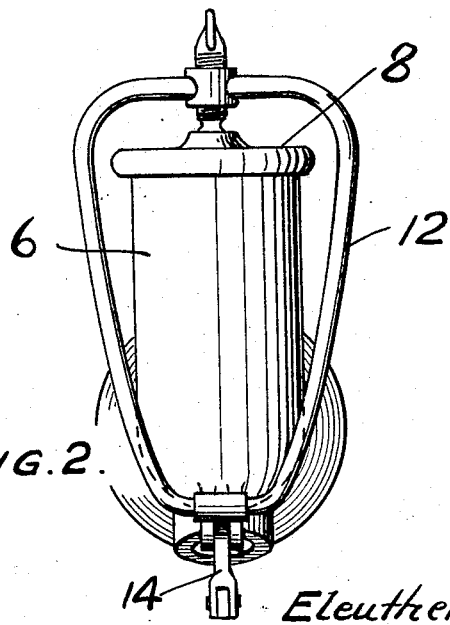

Detailed objects of the invention will be apparent from the following description read in conjunction with the accompanying drawings, in which:

Fig. 1 is a vertical sectional view through a portion of the tank and the detailed parts; and Fig. 2 is a side elevation showing the details of the improved construction.

In its preferred form the invention is shown as applied to a gasoline tank 2 situated under a portion of the automobile frame and behind which there is located a longitudinal member 4 extending downwardly or below the top of the tank. Opening into the rear wall of the tank below the normal level of liquid therein is a filling neck 6 formed as a bent tubular member having its open top about or somewhat above the top of the tank.

Closure of the top of the filler neck is provided by a cap 8 swiveled on the spherical end 10 of a tightening screw threaded through the top of a yoke 12 pivoted to one end of a bell crank lever 14 which is pivoted to a projecting lug on the neck, as indicated at 16. The other end of the bell crank lever 14 is connected to a push rod 18 extended upwardly through a tube 20 forming an air vent passage. The upper end of the rod 18 carries the valve 22 adapted to seat on the upper end of the tube 20 to close the same. A spring 24 is interposed between the valve 22 and a spider 26 located on the inside of the tube adjacent its top. The lower end of the tube passes through the filler neck and opens to the atmosphere.

From the above construction it will be seen that when the cap and the connections are moved to the full line position of Fig. 1, that is, opening the filler neck, the bell crank is free to rock in a clockwise direction so that the valve 22 is open. As the fuel enters the filler neck, the air may escape through the vent tube. When the cap is moved to the dotted line position and tightened against the open end of the filler neck, the bell crank is rocked to engage the valve 22 with its seat on the upper end of the tube. Accordingly it is impossible for the fuel to splash out through the tube and also there can be no considerable escape of inflammable vapors. The usual air vent is, of course, provided in the cap to permit the flow of fuel to the engine.

As an alternative arrangement the parts may be so positioned that the valve closes the lower end of the vent tube. In both cases the vent tube preferably has its outer end at its lowest portion so that liquid may freely drain therefrom.

Various modifications of the preferred embodiment above described will be apparent within the scope of the following claims.

What I claim and desire to protect by Letters Patent is:

1. In combination, a tank for holding a supply of liquid, a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, a removable cap for closing the free end of said filler conduit, and means for closing the passage when the cap is located to close the filler conduit.

2. In combination, a tank for holding a supply of liquid, a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, said outer end being the lowest portion of the passage whereby liquid may drain therefrom, a removable cap for closing the free end of said filler conduit, and means for closing the passage when the cap is located to close the filler conduit.

3. In combination, a tank for holding a supply of liquid, a filler conduit communicating at one end with the tank and opening at its free end outside the tank above the normal level of liquid in the tank but extending below said lever, an air vent passage opening at its inner end within the tank above the normal level of liquid therein and at its outer end outside the tank and the filler conduit, a removable cap for closing the free end of said filler conduit, a valve, and connections between the valve and the cap whereby the valve is located to close the passage when the cap is located to close the filler conduit, and is opened when the filler conduit is uncovered.

4. In combination, a tank for holding a supply of liquid, a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, a removable cap for closing the free end of said filler conduit, a valve located at the inner end of the passage, and connections between the valve and the cap whereby the valve is located to close the passage when the cap is located to close the filler conduit, and is opened when the filler conduit is uncovered.

5. In combination, a tank for holding a supply of liquid, a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, a removable cap for closing the free end of said filler conduit, a lever, link means connecting the cap to the lever, a valve, and connections between the valve and lever whereby the valve is located to close the passage when the cap is located to close the filler conduit, and is opened when the filler conduit is uncovered.

6. In combination, a tank for holding a supply of liquid a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, a removable cap for closing the free end of said filler conduit, a lever, link means connecting the cap to the lever, a valve located at the inner end of the passage, and connections between the valve and lever whereby the valve is located to close the passage when the cap is located to close the filler conduit, and is opened when the filler conduit is uncovered.

7. In combination, a tank for holding a supply of liquid, a filler conduit communicating at one end with the tank and opening at its free end outside the tank above the normal level of liquid in the tank but extending below said level, an air vent passage opening at its inner end within the tank above the normal level of liquid therein and at its outer end outside the tank and the filler conduit, a removable cap for closing the free end of said filler conduit, a lever, link means connecting the cap to the lever, a valve, and a push rod between the valve and lever whereby the valve is located to close the passage when the cap is located to close the filler conduit, and is opened when the filler conduit is uncovered.

In testimony of which invention, I have hereunto set my hand, at Montchanin, Delaware, on this 11th day of March, 1930.

ELEUTHERE PAUL DU PONT.